Feb. 17, 1970  KAZUKO YAMAMOTO  3,495,334
HANDY CURVE-DRAWING DEVICE

Filed May 10, 1968  2 Sheets-Sheet 1

INVENTOR.
KAZUKO YAMAMOTO
BY Sternberg & Blake
attys

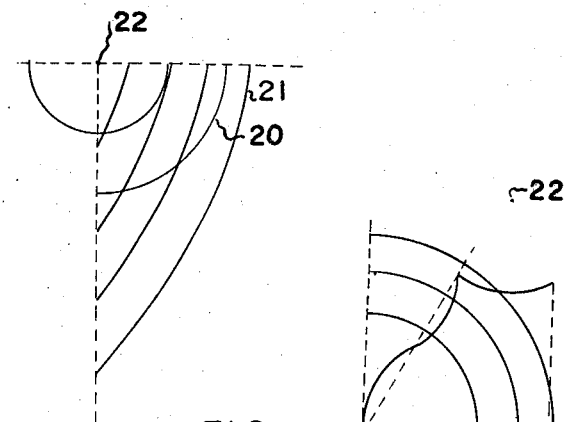
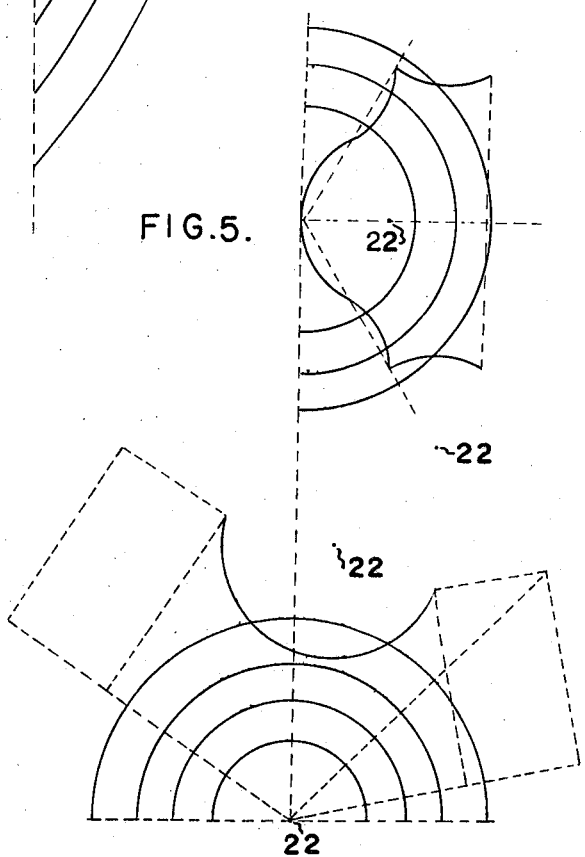

United States Patent Office 3,495,334
Patented Feb. 17, 1970

3,495,334
HANDY CURVE-DRAWING DEVICE
Kazuko Yamamoto, 2592 5-chome, Kamimeguro,
Meguro-ku, Tokyo, Japan
Filed May 10, 1968, Ser. No. 728,150
Int. Cl. B43l 11/00
U.S. Cl. 33—27   2 Claims

ABSTRACT OF THE DISCLOSURE

A device for drawing curves. The device includes a tape measure which is combined with a center-forming unit and a marking unit. The center-forming unit frictionally engages the tape measure and has a sharply pointed projection which will form a center of curvature for the curve which is drawn. The marking unit also frictionally engages the tape measure and this unit has a suitable fitting formed with a tapered opening so that the point of a pencil, for example, can extend through this fitting into engagement with the surface on which the curve is to be drawn. While the units both frictionally engage the tape measure, it is preferred to provide at the marking unit a far greater frictional engagement with the tape measure than at the center-forming unit so that while the marking pencil or the like will remain fixed with respect to the tape measure the latter may be drawn, if desired, frictionally through the center-forming unit in the case, where, for example, it is desired to draw an involute curve.

---

This invention relates to a drawing device which is used to draw many kinds of curves such as, for example, circles, semi-circles, wavy lines, involute curves or the like, particularly in connection with cutting of clothing material and other material, and the invention aims at obtaining a device of this type which has a simple structure, easy handling and a low cost.

Figure 1:
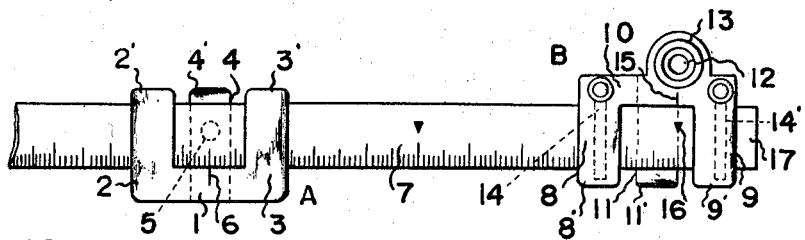
Figure 2:
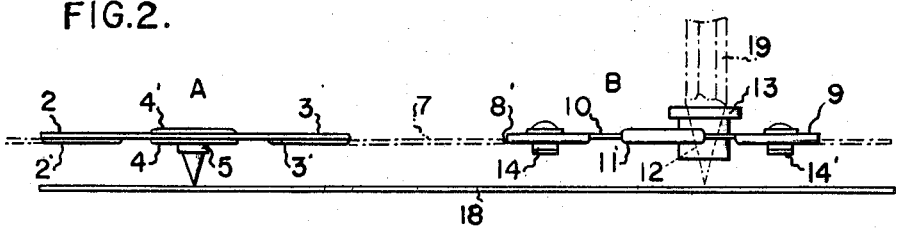
Figure 3:
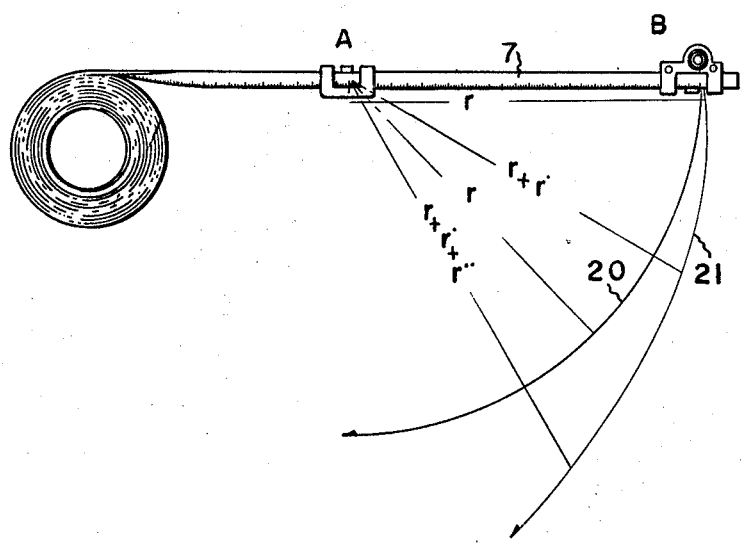

A preferred embodiment of the invention is shown in the accompanying drawings, wherein FIG. 1 is a plan view showing the device in use with a tape-measure installed in the device, which consists of two members. FIG. 2 shows a front view, FIG. 3 shows an explanatory view showing a drawing method using the device, and FIGS. 4 and 5 show examples drawn with the device.

The curve drawing device according to this invention is composed of a movable piece A and a fixing piece B. The movable piece slides on a tape-measure freely with pinching the tape-measure while an adequate force and determining the center of a desired radius. The fixing piece is fixed to the end of the measure tightly and sets the basic point of the measure accurately at the center of a pencil inserting tube. The device aims at drawing a desired curve by locating required points along the measure.

Referring to the drawings which illustrate a preferred embodiment of the invention, first, the movable piece or center-forming means A comprises a frame plate 1 and a supporting piece 4. The frame plate has a substantially U-shape with its sides forming all except one side of a square. End edges 2', 3' of sides 2, 3 of the frame plate are curved slightly in a downward direction as viewed in FIGS. 1 and 2. The supporting plate 4 is projected from the center of backside of the frame plate and edge 4' of the supporting plate is curved slightly in an upward direction, opposite to the downward curvature at the other free ends of the center-forming means A, and in line therewith, as shown in FIG. 1. A tapered pivot 5 is fixed to the underside of supporting plate 4 and the basic index 6 showing the center position of the pivot is marked on the front side of the frame plate. Next, the fixing piece B is used to fix the end of the tape-measure 7 and comprises a frame plate 10 and a supporting plate 11. The frame plate 10 has a U-shape also short of the one side of a square and edges 8', 9' of sides 8, 9 of the frame plate and edge 11' of the supporting plate 11 are curved slightly in opposite directions as with the movable piece A. The longitudinal side of the frame plate 10 is extended to accommodate a pencil inserting tube 13 having a tapered hole. Leaf springs 14, 14' are fixed to the lower surface of sides 8, 9 and the basic index 15 showing the center of the inserting tube is marked on the frame plate 10.

Using the device constructed as described above involves first setting the basic or zero point 16 of the tape-measure in alignment with index 15 of the fixing piece B, and then passing through the end 17 of the tape measure under the side 9 pinching it between the latter and the leaf spring 14'. On the other hand, the other end of the tape measure is passed under the side 8 and tightly pinched between the latter and leaf spring 14.

Secondly, place the tape-measure extending to the left beyond piece B, as viewed in FIGS. 1 and 2, on the supporting plate 4 of the movable piece A and set a selected graduation of the measure to the index 6. Then, install the measure by extending it to the both sides of the movable piece, passing it under the both side plates 2, 3. That is, the movable piece A can hold and pinch the measure with an adequate force by the supporting plate 4 and side plates 2, 3.

The method of use is as follows: First, fix the movable piece A, set at a desired radius, on the required cutting paper by means of the center or pivot 5 as shown in the FIGS. 2 and 3. Secondly, insert a pencil into the tapered hole 12 of the inserting tube 13 of the fixing piece B. Lastly, swing the measure 7 while drawing it to the rightward so as to stretch the tape-measure 7 tightly. Thus, a locus of circle having a desired radius $r$ is obtained.

Next, although the movable piece A is pinching the tape-measure, its pinching force is weak, therefore the radius $r$ varies when the tape-measure is drawn strongly to rightward while drawing an arc and it is possible to draw an accurate involute curve by the sum of the longitudinal pulling velocity and angular velocity of circling.

In addition, when the fixing piece B is made up so that the right-hand end of the supporting plate 11 coincides with center line of the pencil inserting tube, it is possible to hold the measure tightly on the right side end of supporting plate, even if the end is bending in the shape of hook such as a metal tape-measure.

As ends of side plate and supporting plates of the movable piece A and the fixing piece B curve in opposite directions respectively, the tape measure never slips out from the movable piece or the fixing piece during handling.

FIGS. 4 and 5 show example drawn with the device. Each solid line shows a curve which is drawn with the device and each dotted line shows one drawn with a ruler. Also each point 22, 22 shows a position on which the supporting pivot 5 of the movable piece A is placed.

As the movable piece can slide freely on the measure, it is possible to get a large radius R in proportion to a length of measure. Therefore, a small circle and a curve which are never drawn with a customary tool can be drawn.

As described above, handling of the device is very simple, the function is reliable and accurate drawing is possible. Therefore the device can be used not only in cutting of clothing material, but also in common drawing.

I claim:
1. A curve drawing device comprising a tape measure, center-forming means frictionally connected with said tape measure to form a center of curvature for a curve which is drawn, and marking means also frictionally connected with said tape measure and located at a given distance from said center-forming means for situating a marking instrument at a selected distance from the center determined by said center-forming means so as to determine the character of a curve drawn by swinging the marking instrument around the center formed by said center-forming means while maintaining the tape measure in a taut condition where it extends between said center-forming means and said marking means, said center-forming means including a substantially U-shaped frame plate engaging the tape measure on one side thereof, said frame plate having a pair of opposed side portions and a third portion extending therebetween longitudinally along the the tape measure while said side portions extend transversely across the tape measure, a center-carrying leg extending transversely across and engaging the side of the tape measure opposite from said side portions of said frame plate, said leg being situated intermediate said side portions and being fixed to and extending from said third portion of said frame plate, and a center-point fixed to said leg and extending from a surface thereof which is directed away from the tape measure, said side portions of said frame plate terminating in free ends curved toward the side of the tape which is engaged by said leg while said leg terminates in a free end curved toward the side of said tape which is engaged by said side portions.

2. The combination of claim 1 wherein said marking means engages the tape measure with a force of friction greater than the force of friction with which said center-forming means engages the tape measure, and the latter force of friction being of a magnitude which permits the tape measure to be pulled through the center-forming means while drawing a curve, so that involute curves and the like may be drawn.

References Cited

UNITED STATES PATENTS

| | | | |
|---|---|---|---|
| 1,636,036 | 7/1927 | Bartlett. | |
| 1,988,095 | 1/1935 | Stockman. | |
| 2,026,768 | 1/1936 | Aronson. | |
| 2,373,338 | 4/1945 | Rakauskas | 33—173 |
| 2,075,528 | 3/1937 | Letzerich. | |
| 2,303,024 | 11/1942 | Clark. | |
| 2,832,141 | 4/1958 | Taylor. | |
| 3,293,754 | 12/1966 | Lenzini et al. | |

FOREIGN PATENTS

| | | |
|---|---|---|
| 831,503 | 6/1938 | France. |
| 561,817 | 6/1944 | Great Britain. |

HARRY N. HAROIAN, Primary Examiner

U.S. Cl. X.R.

33—158